(12) United States Patent
Venkataraman et al.

(10) Patent No.: US 12,133,295 B2
(45) Date of Patent: Oct. 29, 2024

(54) 5G NEW RADIO NAS NOTIFICATION PROCEDURES

(71) Applicant: Apple Inc., Cupertino, CA (US)

(72) Inventors: Vijay Venkataraman, Sunnyvale, CA (US); Krisztian Kiss, Hayward, CA (US); Lakshmi N. Kavuri, San Jose, CA (US); Yifan Zhu, San Jose, CA (US); Muthukumaran Dhanapal, Dublin, CA (US); Srinivasan Nimmala, San Jose, CA (US); Hariharan Sukumar, San Diego, CA (US); Shivani Suresh Babu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/525,934

(22) Filed: Jul. 30, 2019

(65) Prior Publication Data
US 2020/0053830 A1     Feb. 13, 2020

Related U.S. Application Data

(60) Provisional application No. 62/718,327, filed on Aug. 13, 2018.

(51) Int. Cl.
*H04W 88/02*     (2009.01)
*H04W 60/00*     (2009.01)
(Continued)

(52) U.S. Cl.
CPC ....... *H04W 88/023* (2013.01); *H04W 60/005* (2013.01); *H04W 68/02* (2013.01);
(Continued)

(58) Field of Classification Search
CPC . H04W 88/023; H04W 60/005; H04W 68/12; H04W 76/16; H04W 76/28;
(Continued)

(56) References Cited

U.S. PATENT DOCUMENTS 8,755,316 B2    6/2014   Aschan
9,414,248 B2    8/2016   Kovvali
(Continued)

FOREIGN PATENT DOCUMENTS

CN     101990776 A     3/2011
CN     104170483 A     11/2014
(Continued)

OTHER PUBLICATIONS

First Office Action for CN Patent Application No. 201910741920.1; 8 pages. Dec. 28, 2021.
(Continued)

*Primary Examiner* — Harry H Kim
*Assistant Examiner* — Mohammed M Murshid
(74) *Attorney, Agent, or Firm* — Kowert, Hood, Munyon, Rankin & Goetzel, P.C.

(57) ABSTRACT

Apparatuses, systems, and methods for a wireless device to perform methods to dual-registration in a fifth generation (5G) New Radio (NR) network, including notification procedure enhancements over cellular (e.g., 3GPP) and non-cellular (e.g., non-3GPP) access, dual-registration enhancements, and paging enhancements. Methods also include procedures for a network to determine an access type to notify a UE of pending data and for a wireless device and network to mitigate paging collisions.

20 Claims, 15 Drawing Sheets

(51) Int. Cl.
*H04W 68/02* (2009.01)
*H04W 68/12* (2009.01)
*H04W 76/16* (2018.01)
*H04W 76/25* (2018.01)
*H04W 76/27* (2018.01)
*H04W 76/28* (2018.01)

(52) U.S. Cl.
CPC ........... *H04W 68/12* (2013.01); *H04W 76/16* (2018.02); *H04W 76/25* (2018.02); *H04W 76/27* (2018.02); *H04W 76/28* (2018.02)

(58) Field of Classification Search
CPC ..... H04W 76/25; H04W 76/27; H04W 68/02; H04W 88/06; H04W 68/00
See application file for complete search history.

(56) References Cited

U.S. PATENT DOCUMENTS

| | | | |
|---|---|---|---|
| 9,716,558 B1 | 7/2017 | Buthler | |
| 10,193,591 B2 | 1/2019 | Clevorn | |
| 10,264,481 B2 | 4/2019 | Patel | |
| 11,297,597 B2* | 4/2022 | Lee | H04W 76/27 |
| 2008/0311923 A1* | 12/2008 | Petrovic | H04W 76/12 455/450 |
| 2009/0215472 A1* | 8/2009 | Hsu | H04W 8/183 455/458 |
| 2013/0225123 A1* | 8/2013 | Adjakple | G06Q 20/322 455/406 |
| 2013/0244660 A1 | 9/2013 | Kumar et al. | |
| 2014/0119343 A1 | 5/2014 | Chin | |
| 2015/0017982 A1* | 1/2015 | Klatt | H04W 68/00 455/434 |
| 2015/0319734 A1* | 11/2015 | Zhang | H04W 68/005 455/458 |
| 2016/0330791 A1* | 11/2016 | Vajapeyam | H04W 76/28 |
| 2017/0331577 A1 | 11/2017 | Parkvall | |
| 2018/0220329 A1 | 8/2018 | Bhaskaran | |
| 2018/0242277 A1* | 8/2018 | Liu | H04W 8/005 |
| 2018/0343635 A1* | 11/2018 | Edge | G01S 5/0036 |
| 2018/0359801 A1* | 12/2018 | Kim | H04L 69/22 |
| 2018/0368099 A1* | 12/2018 | Chen | H04W 48/18 |
| 2019/0007500 A1* | 1/2019 | Kim | H04L 67/141 |
| 2019/0007992 A1* | 1/2019 | Kim | H04W 76/27 |
| 2019/0059067 A1* | 2/2019 | Lee | H04L 67/141 |
| 2019/0098597 A1 | 3/2019 | Malick | |
| 2019/0174571 A1 | 6/2019 | Deenoo | |
| 2020/0022038 A1* | 1/2020 | Han | H04W 74/006 |
| 2020/0120741 A1* | 4/2020 | Lindheimer | H04W 68/08 |
| 2020/0178196 A1* | 6/2020 | Wang | H04W 60/005 |
| 2020/0196112 A1* | 6/2020 | Chandramouli | H04W 4/14 |
| 2021/0314910 A1* | 10/2021 | Rune | H04L 5/0094 |

FOREIGN PATENT DOCUMENTS

| | | |
|---|---|---|
| CN | 104982050 A | 10/2015 |
| CN | 106576234 | 4/2017 |
| CN | 106576295 | 4/2017 |
| CN | 107005963 | 8/2017 |
| WO | 2017024856 A1 | 2/2017 |
| WO | 2017074795 A1 | 5/2017 |
| WO | WO2018144873 A1 | 8/2018 |

OTHER PUBLICATIONS

Xiao Hai et al."Research on Key Technologies of SRLTE Terminal"; Mobile communications, No. 05, 5 pages; Mar. 15, 2015.
Vivo "Impacts of dual camping UE"; 3GPP TSG-RAN WG2 Meeting #99bis R2-1710927; Prague, Czech Republic; 6 pages; Oct. 13, 2017.
Office Action for CN Patent Application No. 202211015907.6; Jul. 30, 2024.

* cited by examiner

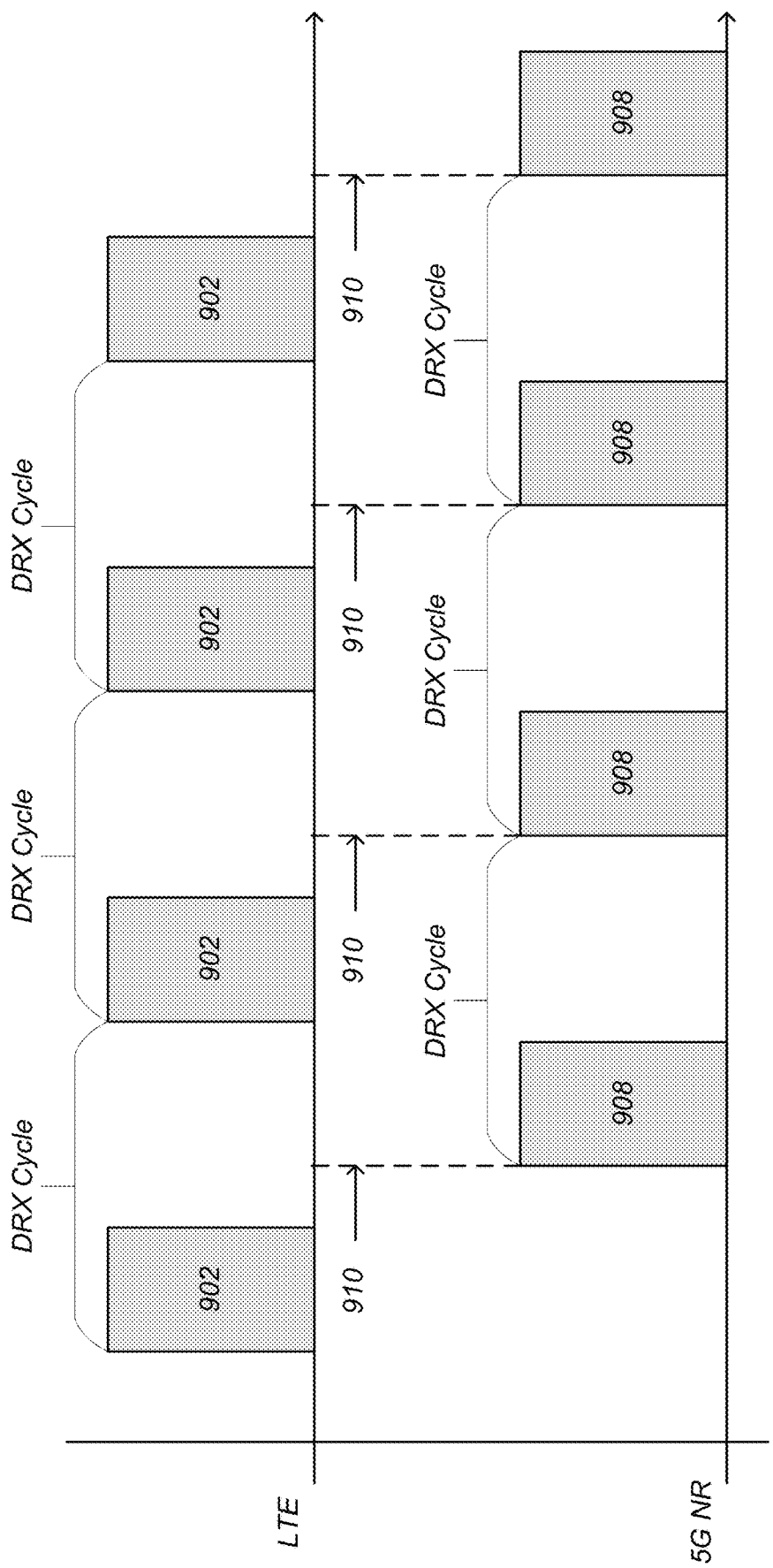

5G NEW RADIO NAS NOTIFICATION PROCEDURES

PRIORITY DATA

This application claims benefit of priority to U.S. Provisional Application Ser. No. 62/718,327, titled "5G New Radio NAS Notification Procedures", filed Aug. 13, 2018, which is hereby incorporated by reference in its entirety as though fully and completely set forth herein.

FIELD

The present application relates to wireless devices, and more particularly to apparatus, systems, and methods for improvements to dual-registration in a fifth generation (5G) New Radio (NR) network, including notification procedure enhancements, dual-registration enhancements, and paging enhancements.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of the less restrictive UE scheduling in order to further leverage power savings opportunities.

SUMMARY

Embodiments relate to apparatuses, systems, and methods for improvements to dual-registration in a fifth generation (5G) New Radio (NR) network, including notification procedure enhancements, dual-registration enhancements, and paging enhancements.

In some embodiments, a user equipment device (UE) registered on first and second access networks may be configured to perform methods for determining that a first periodic paging window for the first access network overlaps with a second periodic paging window of the second access network, wherein the overlap causes the UE to miss at least one page on one of the first or second access networks and performing a collision avoidance procedure to adjust the timing of the second periodic paging window relative to the first periodic paging window, thereby allowing the UE to receive pages on both the first and second access networks. In some embodiments, the collision avoidance procedure may include transmitting a NAS uplink message to one of the core networks to request to change one of periodic paging windows; negotiating a paging offset with one of the access networks, including transmitting a NAS registration uplink message that indicates the paging offset, or receiving over non-cellular (e.g., non-3GPP) access (e.g., such as Wi-Fi), a NAS notification message from one of the access networks indicating pending downlink information. In some embodiments the change in the period paging window may at least partially reduce the overlap between the periodic paging windows, thereby allowing the UE to receive pages from both access networks. In some embodiments, the paging offset may shift the paging windows relative one another such that the overlap between the periodic paging windows is at least partially reduced, thereby allowing the UE to receive pages from both access networks.

In some embodiments, a user equipment device (UE) registered on first and second cellular access networks and simultaneously registered to a common core network through non-cellular access, may be configured to perform methods for operating in a dual-registration mode with mobile initiated only connection mode (MICO) mode enabled. The UE may be configured to perform a method including registering on the first cellular access network with an indication that the UE supports dual-registration mode and requesting MICO mode for the first cellular access network, registering on the second cellular access network, communicating on the second cellular access network, determining that a quality of service requirement for an application is greater than a quality of service currently available via the non-cellular access network, and initiating a connection on the first cellular access network to increase an available quality of service, thereby meeting the quality of service requirement for the application. In some embodiments the first cellular access network may be a 5G NR access network, the second cellular access network may be a 4G access network, and the non-cellular access may be a non-3GPP access network connected to the common core network, which may be a fifth generation (5G) core network.

In some embodiments, a network node, network entity or functional entity comprised within the network entity and/or within the network node may be configured to perform methods for determining that the network has pending downlink information for a UE and in response to determining that the UE is in a connected state (e.g., a CM-Connected state), transmitting, in response to determining that the UE is dual registered or that the UE is not dual registered but has missed a prior page over 3GPP (e.g., cellular) access, a NAS notification message over non-3GPP access, wherein the NAS notification message indicates access type as 3GPP.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9B illustrates an example of a paging offset for a dual registered UE, according to some embodiments.

Figure 1A:
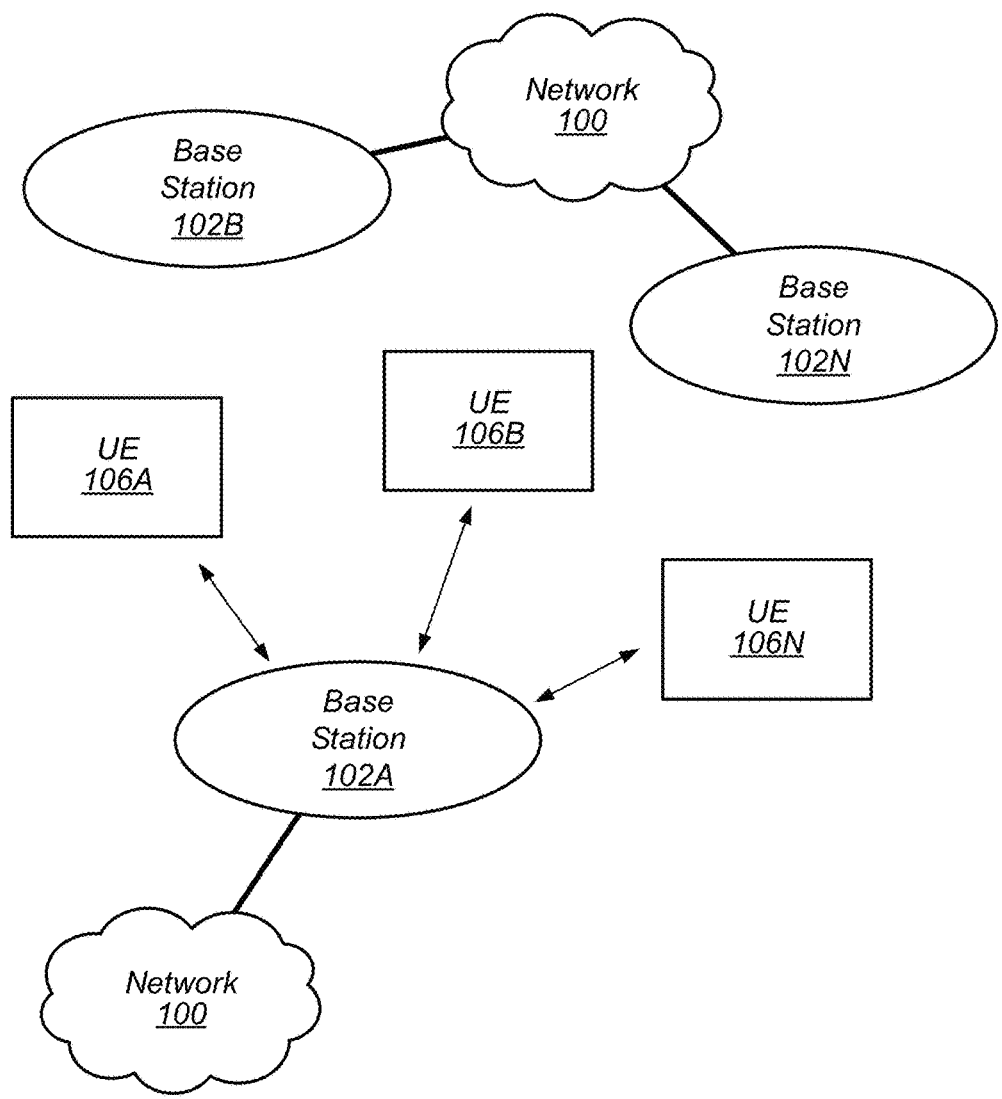
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
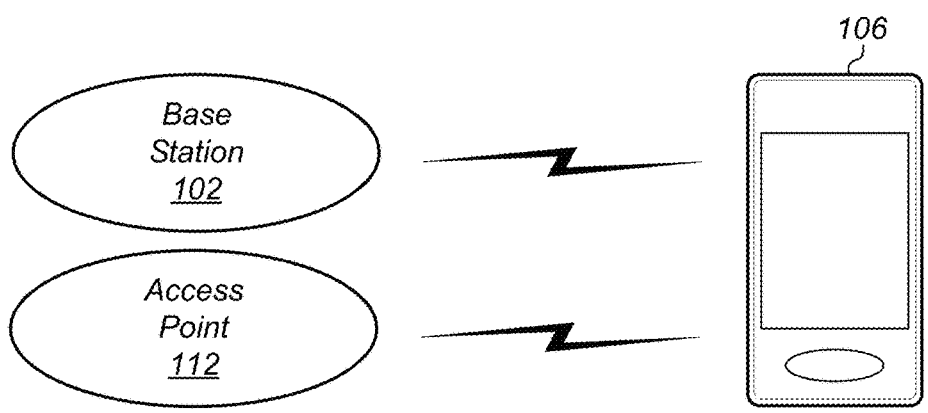
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
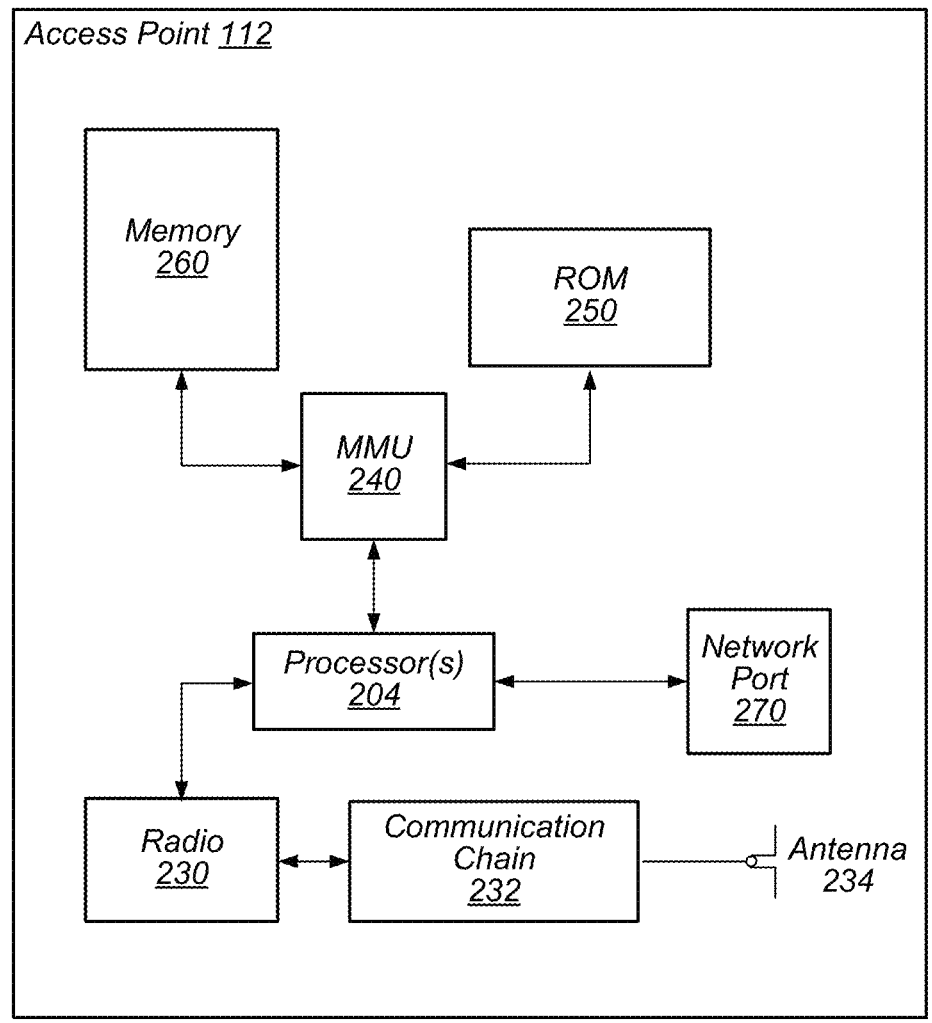
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods to improve dual-registration in a 5G NR network, including notification procedure enhancements, dual-registration enhancements, and paging enhancements as further described herein.

Figure 3:
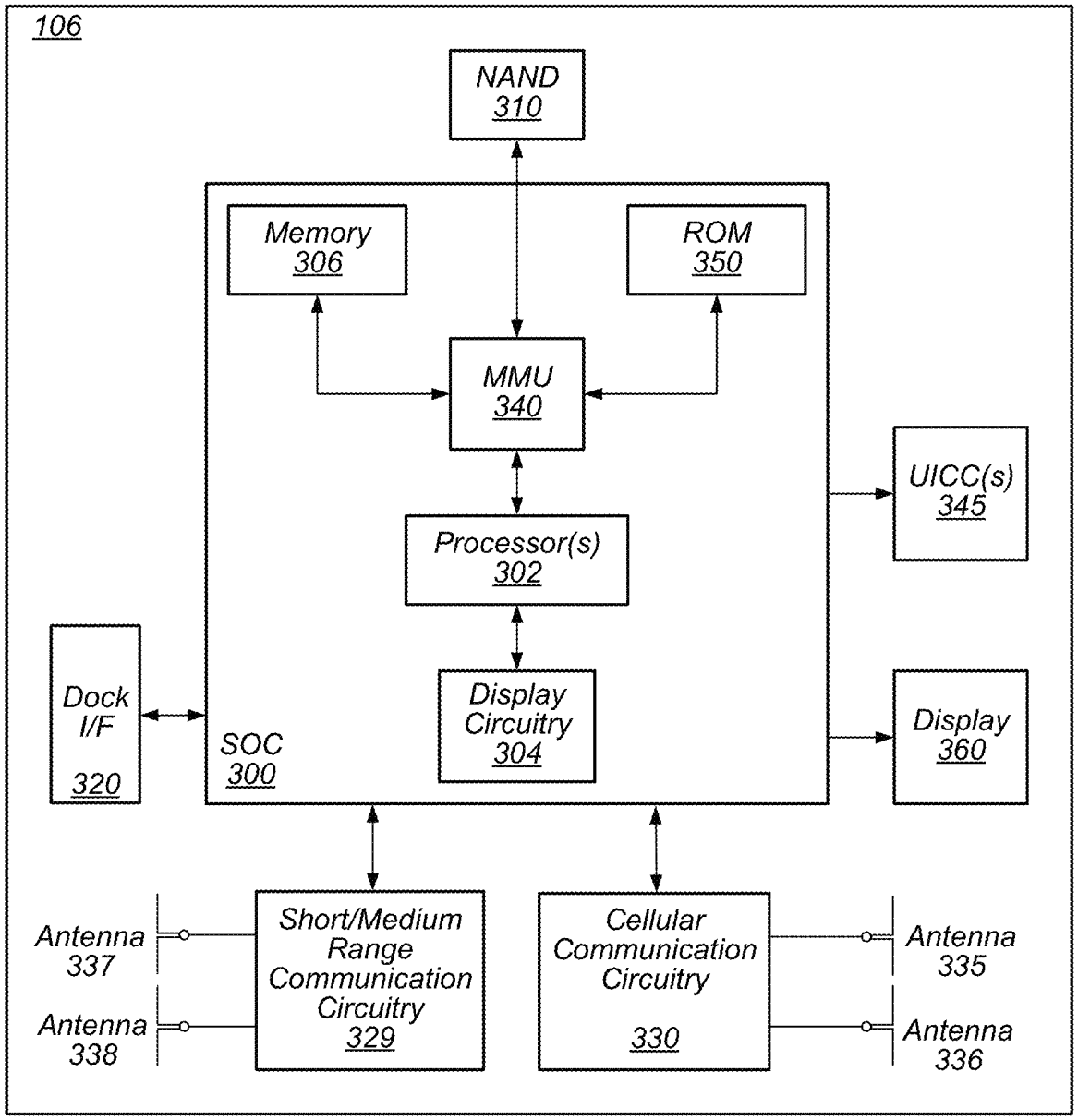
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively;

directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods to improve dual-registration in a 5G NR network, including notification procedure enhancements, dual-registration enhancements, and paging enhancements as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
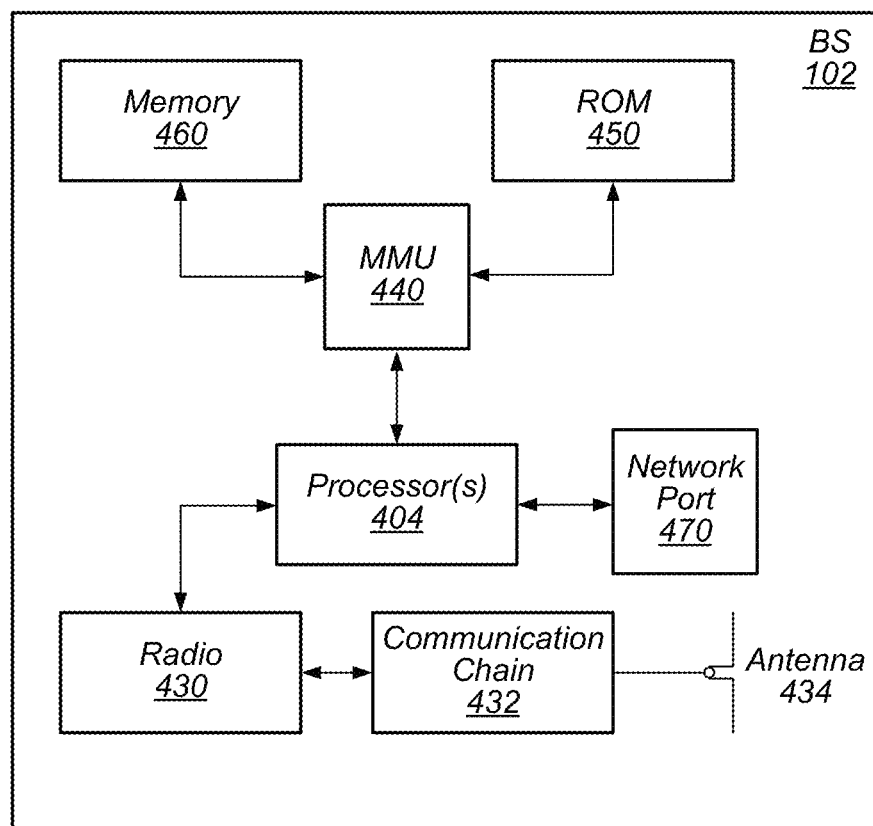
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
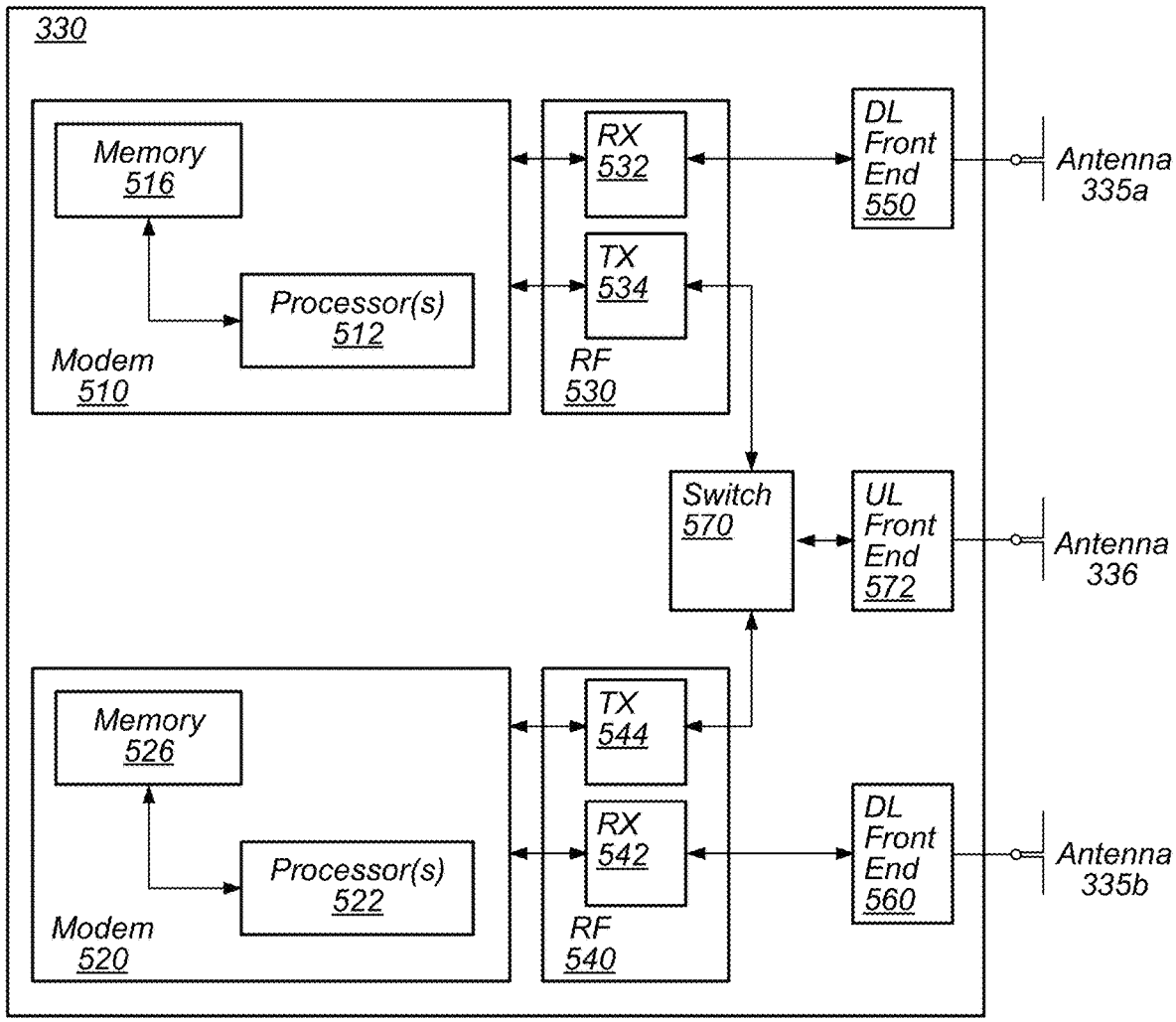
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods to improve dual-registration in a 5G NR network, including notification procedure enhancements, dual-registration enhancements, and paging enhancements as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
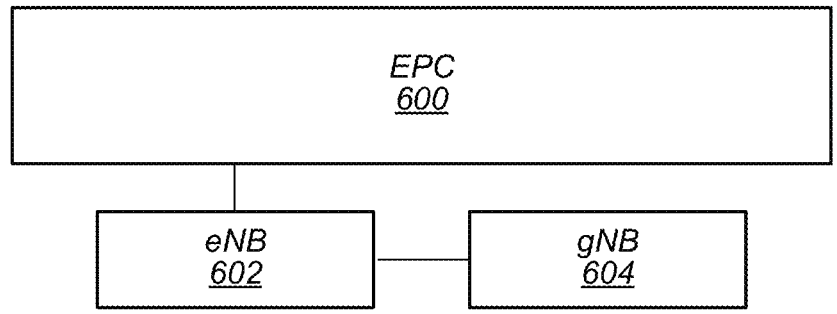
FIG. 6A illustrates an example of connections between an EPC network, an LTE base station (eNB), and a 5G NR base station (gNB).
Figure 6B:
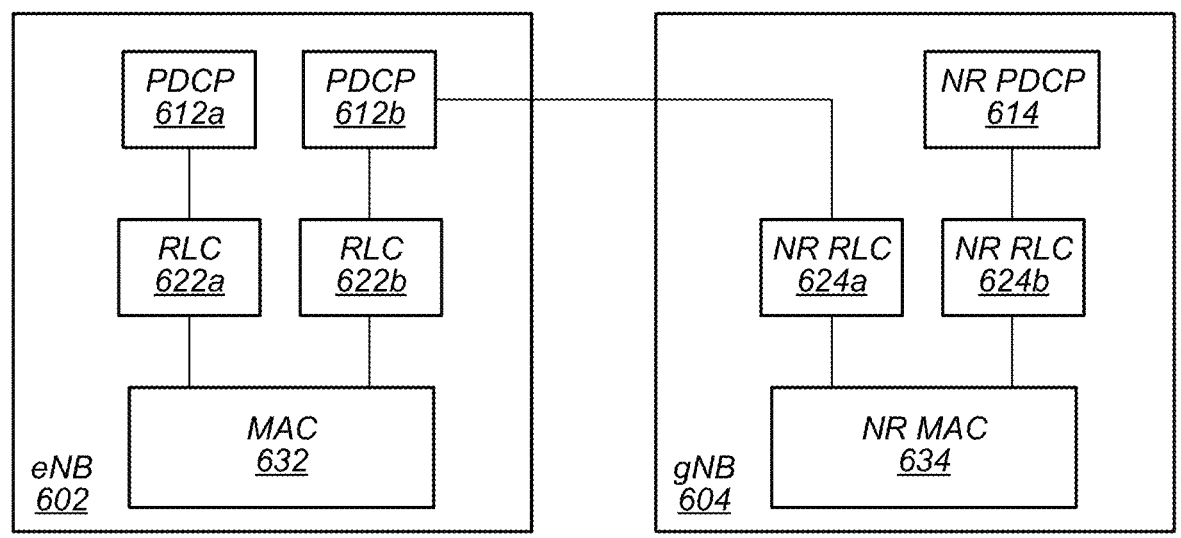
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
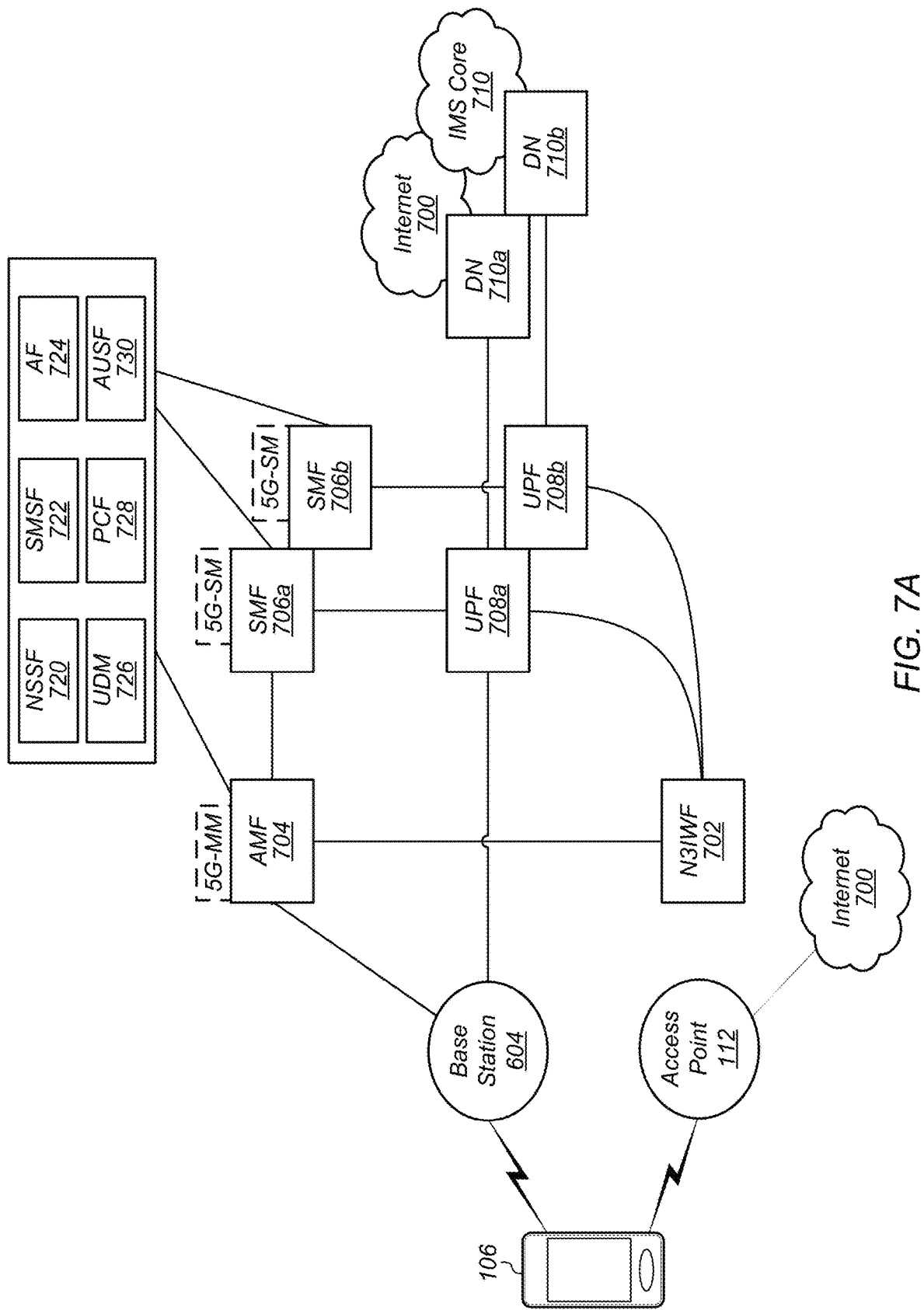
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
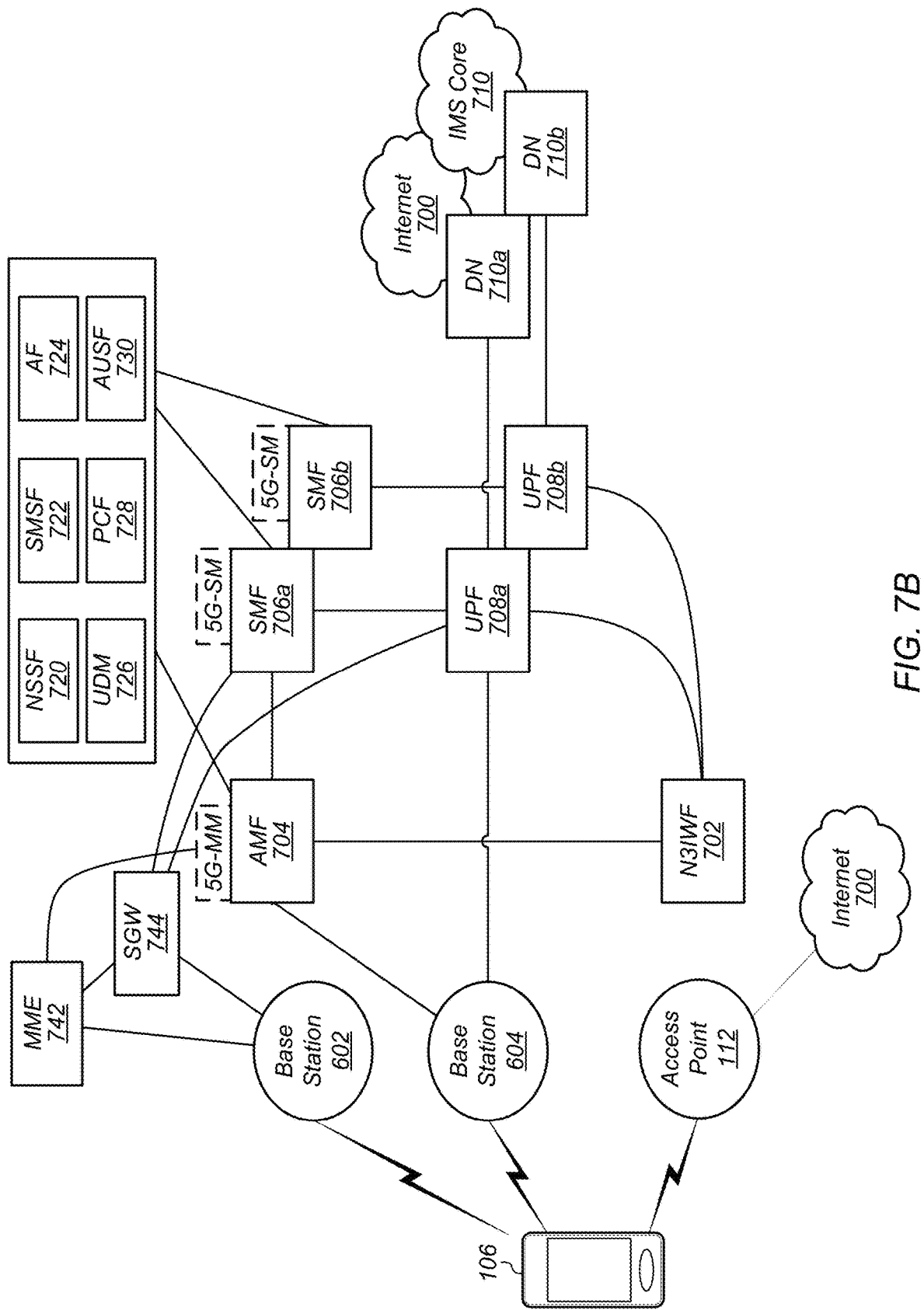
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR)

access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve dual-registration in a 5G NR network, including notification procedure enhancements, dual-registration enhancements, and paging enhancements, e.g., as further described herein.

Figure 8:
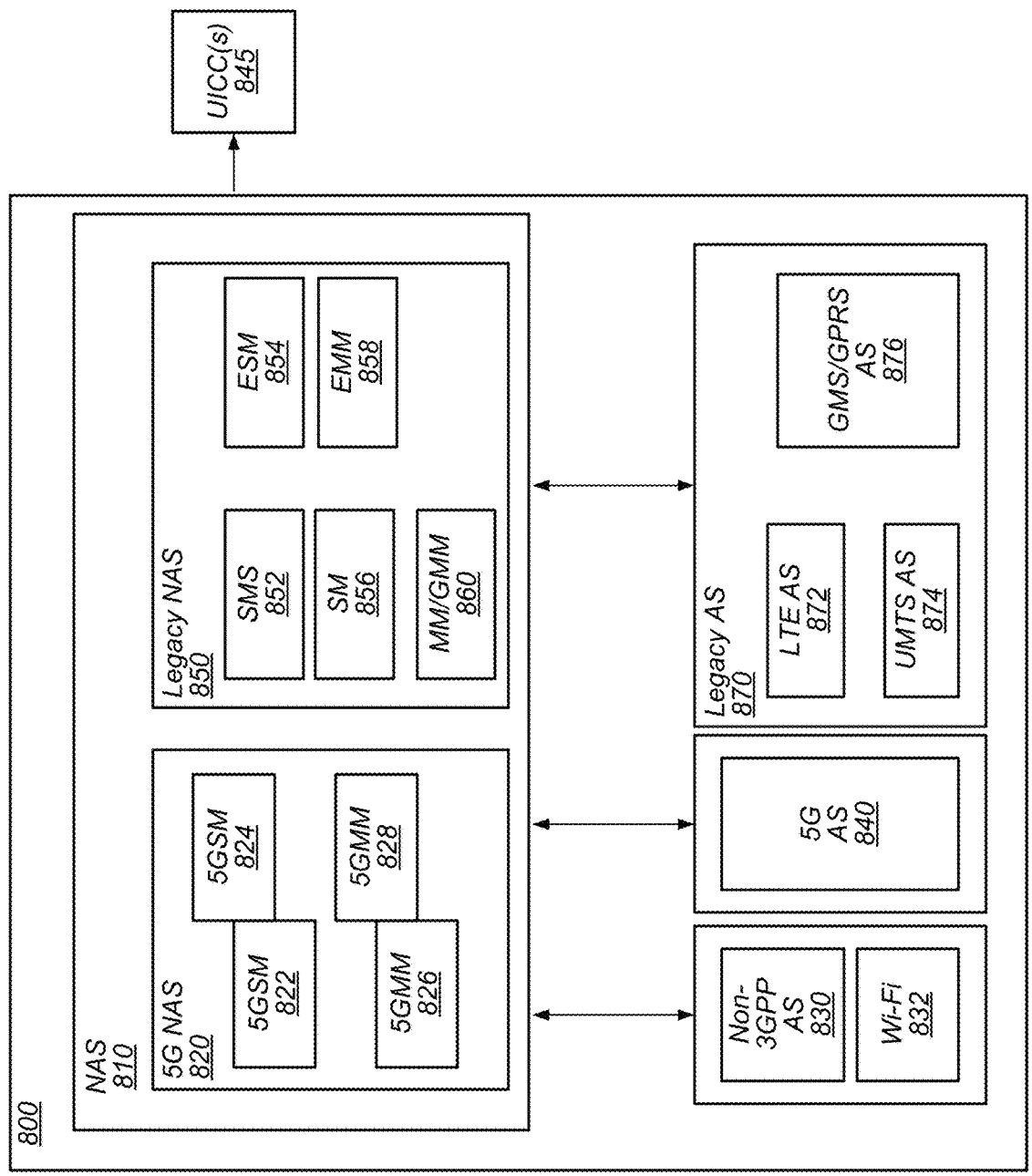
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520 as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 (e.g., such as Wi-Fi AS 832). The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods to improve dual-registration in a 5G NR network, including notification procedure enhancements, dual-registration enhancements, and paging enhancements, e.g., as further described herein.

5G NR Dual-Registration Mode

In some implementations, a device may register to both a 4G network (e.g., such as an evolved packet core (EPC) network) and a 5G network independently and maintain a registration status with both the 4G network and the 5G network on a single public land mobile network (PLMN). A device that supports dual-registration mode may operate in the dual-registration mode when an interworking bit (e.g., IWK N26) in the 5G network feature support information element (IE) indicates that the network supports dual-registration mode (e.g., the IE is set to "interworking without N26 supported") in a registration accept message, such as a network access stratum (NAS) message. Additionally, the device may perform periodic registration updates on both networks to maintain registered status on each network. Further, the device may move any (and/or all) PDUs from one network (or technology) to the other network at any time and the networks may maintain IP continuity of the PDUs. In addition, the device may maintain independent security contexts for each network.

In some implementations, dual-registration mode may be used to compensate for sporadic 5G network availability. For example, initial 5G network deployments may not have as much coverage (or availability) as existing 4G networks. In addition, initial 5G network deployments may not support voice over an IP multimedia subsystem (IMS) (e.g., packet switched voice communication, such as voice over NR (VoNR) and further, may be mainly relied on to increase downlink speed and address downlink capacity concerns. Thus, in these scenarios, a device operating in a dual-registration mode may use the 4G network for mobile originating/mobile terminating (MO/MT) voice call purposes and the 5G network for uplink and downlink data transfer purposes. In addition, in cases of sporadic 5G network availability, when a device loses 5G coverage, the device may quickly (or immediately) move the PDU to the 4G network with minimum delay as the 4G network already has the device's context. Further, hand-off delay may also be reduced for similar reasons.

However, in idle mode, the device may be required to listen to paging on both access networks by waking-up at appropriate discontinuous reception (DRX) cycle periods specified by the networks. In other words, the device may be required to tune an antenna to monitor the paging at regular intervals. Thus, as further discussed below, a device may miss pages from one of the access networks due to paging collisions (or overlaps) between the access networks. Further, when a voice call (either MO or MT) over the 4G network occurs, the device needs to inform the 5G network by sending a service request message. Similarly, if the device needs to move completely to one of the access networks (e.g., a 4G dedicated connection or a 5G dedicated connection), the device needs to send an extended service request to access network losing the connection. Note that once the device has moved to a dedicated connection, the device may be required to perform a registration procedure on the other access network to resume dual-registration mode.

Paging Collision Avoidance

In some implementations, a device operating in a 5G NR dual-registration mode (e.g., registered on both a 4G and a 5G network) may miss mobile terminating (MT) pages when discontinuous reception (DRX) cycles for the networks collide (or overlap). For example, a device may be capable (or may be operating in) a single radio mode while also in 5G NR dual-registration mode, thus overlap of the DRX cycles for the networks may result in a missed MT page. Such missed MT pages may result in a poor user experience.

According to 3GPP TS 24.501 Release 15, if both 5GMM and EMM are enabled, a UE, which is operating in the dual-registration mode and capable of N1 mode and S1 mode, can maintain independent registrations for 5GMM and EMM independently. Further, coordination between 5GMM and EMM is not necessary, except when:

a) a UE operating in the dual-registration mode registers to N1 mode only, S1 mode only, or to both N1 mode and S1 mode;

b) a UE decides to operate in dual-registration an NAS informs lower layers;

c) a UE is registered in N1 mode only, then for registration in S1 mode the UE can use the same PLMN to which it is registered in N1 mode or an equivalent PLMN; or d) a UE is registered in S1 mode only, then for registration in N1 mode the UE can use the same PLMN to which it is registered in S1 mode or an equivalent PLMN. Thus, when in dual-registration mode (and in a non-eLTE deployment) a UE may need to camp simultaneously on unique frequencies, e.g., on an E-UTRA cell for LTE functionality and on a 5G NR cell for 5G system (5GS) functionality. In such instances, it may be likely that the paging occasion of an LTE cell and an NR cell may collide (or overlap), leading to the UE missing an MT page for one of the systems.

Figure 9A:
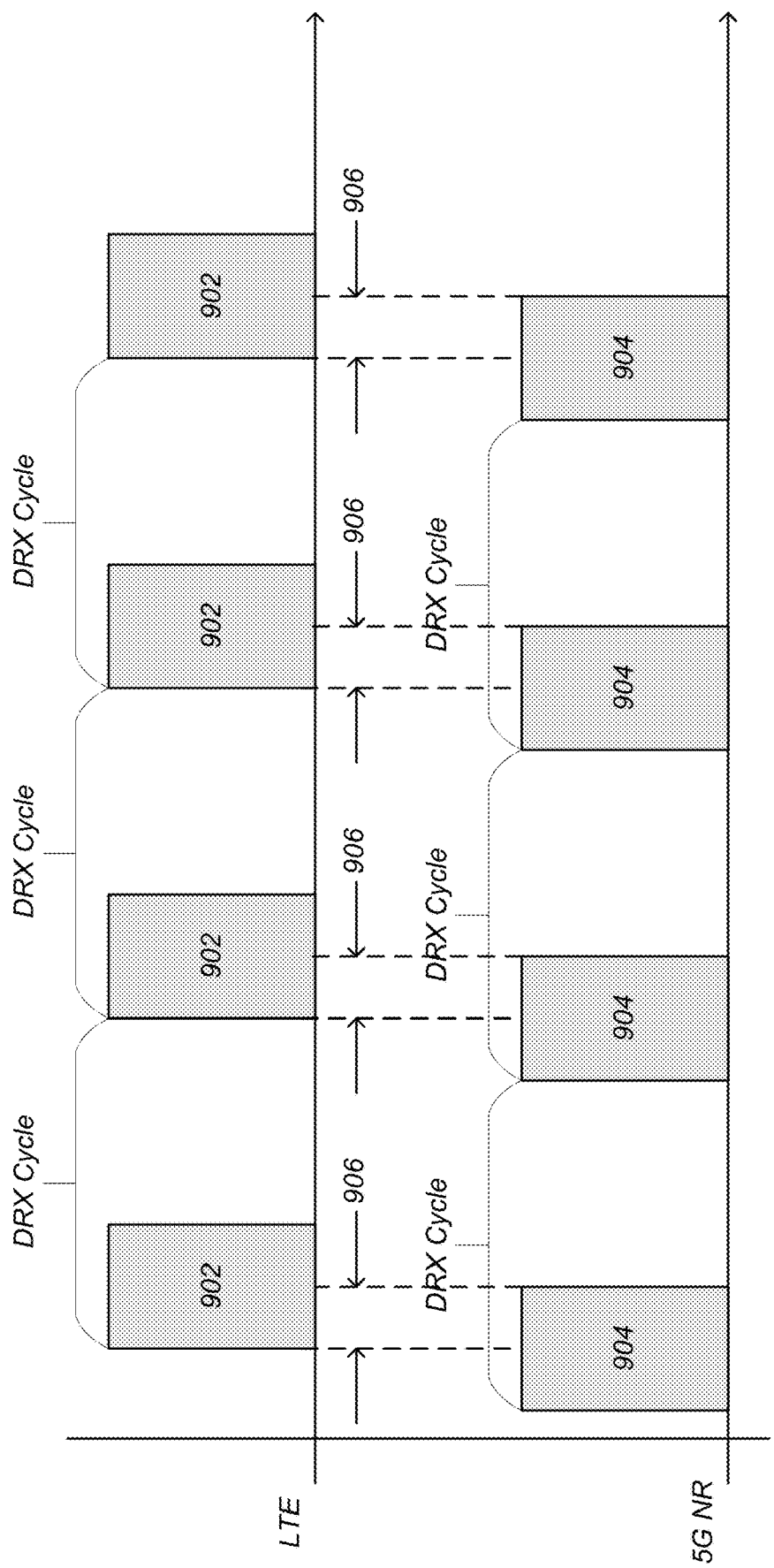
FIG. 9A illustrates an example of paging collisions for a dual registered UE.

For example, FIG. 9A illustrates an example of paging collisions for a device operating in a 5G NR dual-registration mode. As shown, an LTE timeline of the device may include reception periods 902 during a DRX cycle. In addition, a 5G NR timeline of the device may include reception periods 904 during a DRX cycle. In some implementations, the reception periods 902 and 904 may overlap for a time period 906. Thus, when the device is operating in a single radio mode, the device may miss an MT page for one of the networks (e.g., LTE or 5G NR) during the overlapping time periods 906.

In some embodiments, a device (e.g., such as UE 106) may specify or request a DRX cycle. For example, a UE may specify a DRX cycle (e.g., a UE specific DRX cycle) in a network access stratum (NAS) registration uplink (UL) message. The NAS registration UL message may request that the network change the DRX cycle for the UE. In some embodiments, the UE may specify a higher DRX cycle value such that the paging collision (or overlap) may be avoided and/or reduced. In some embodiments, when a UE specifies a higher DRX value (e.g., compared to a default and/or network specified DRX value included in a broadcast message), the network may honor the UE's request and may use the DRX value indicated by the UE instead of using the DRX value specified in a broadcast message sent from the network to the UE.

In some embodiments, a device (e.g., such as UE 106) may negotiate a paging offset with a network. In some embodiments, the UE may indicate a paging offset via a NAS registration UL message. In some embodiments, the UE may specify a paging offset in the NAS registration UL message such that a paging collision (or overlap) between networks may be avoided because the paging occasion in one of the networks may be moved by an offset to avoid a collision. In other words, the paging offset may shift a paging window for one network relative to another network. For example, the paging window for a 5G NR network may be shifted (or offset) relative to a paging window for an LTE network. In other words, in some embodiments, a DRX cycle for one network may be effectively offset relative to a DRX cycle for another network.

As an example, FIG. 9B illustrates a paging offset for a dual registered UE, according to some embodiments. As shown, the reception periods 908 for a 5G NR DRX timeline may be shifted (or offset) by an offset 910 to avoid overlapping (or colliding) with reception periods 902. Such an offset may improve call performance and page monitoring by a UE, such as UE 106. In addition, such an offset may enhance battery performance. In some embodiments, the dual registered UE may request (or specify) the offset 910 via signaling to a serving base station. For example, the serving base station may be a legacy base station, such as eNB 602. As another example, the serving base station may be a 5G NR base station, such as eNB 604. In some embodiments, the signaling may include a NAS registration UL message, e.g., as described above.

In some implementations, an MT page (or other downlink notification) may be missed due to poor radio conditions. In such implementations, the device may be operating in either single or dual-registration mode. According to 3GPP TS 23.501 Release 15, when a device's connection management (CM) state in the AMF is CM-IDLE for 3GPP access and CM-CONNECTED for non-3GPP access, the AMF can perform a network triggered service request procedure when the network has DL data to be sent to the device for 3GPP access by sending a paging request. The paging request may be sent via 3GPP access or via a NAS notification via non-3GPP. In other words, when a device's CM state is CM-CONNECTED for non 3GPP access, a NAS notification message may be sent over non-3GPP access indicating an access type as 3GPP. Thus, in some embodiments, a network may use NAS notification messaging via non-3GPP access to deliver downlink notifications (e.g., such as MT pages) to a UE.

Figure 10:
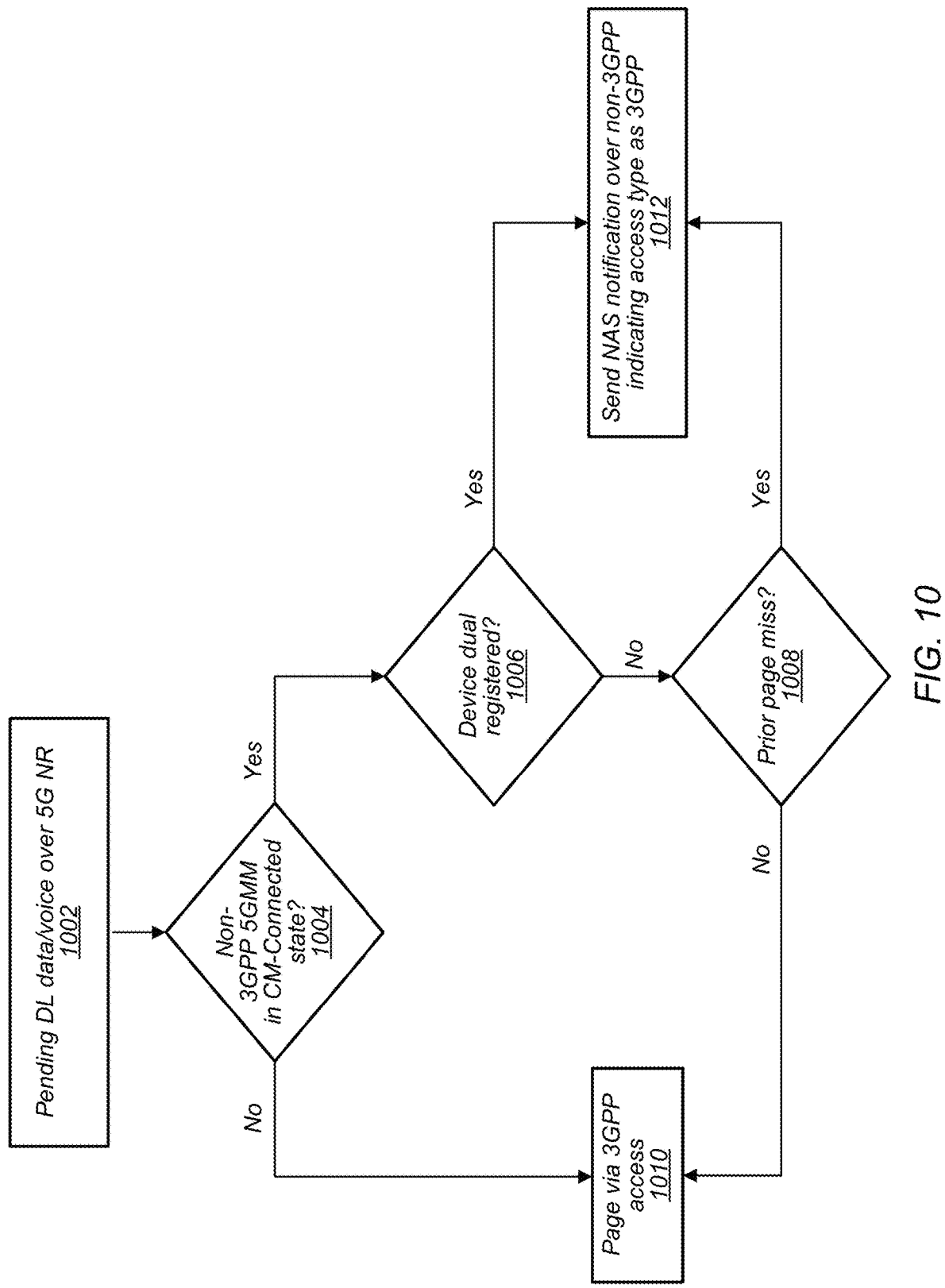
FIG. 10 illustrates an example of a flow diagram for a network to determine an access type to notify a UE of pending downlink information, according to some embodiments.

FIG. 10 illustrates an example of a flow diagram for a network to determine an access type to notify a UE of pending downlink information, according to some embodiments. The flow diagram shown in FIG. 10 may be used in conjunction with any of the systems or devices shown in the above Figures, among other devices. In various embodiments, some of the elements shown may be performed concurrently, in a different order than shown, or may be omitted. Additional elements may also be performed as desired. As shown, this flow diagram may operate as follows.

At 1002, a network (e.g., a network entity and/or network node, such as gNB 604) may determine that there is pending downlink information for a UE, such as UE 106. The pending downlink information may be associated with voice and/or data. Delivery of the pending downlink information may be over (or via) a 5G NR network.

At 1004, the network may determine whether a non-3GPP (e.g., non-cellular) 5GMM function (or entity) associated with the UE is in a CM-CONNECTED state. In other words, the network may determine a connection state of a 5G mobility management function associated with the UE.

At 1006, in response to determining that the UE is in a connected state over non-3GPP access, the network may further determine whether the UE is dual registered, e.g., over EPC and 5GC. In other words, the network may determine a registration mode of the UE.

At 1008, in response to determining that the UE is not dual registered, the network may determine whether a prior page was missed by the UE. In other words, the network may determine whether the UE received and/or responded to a prior page associated with the pending downlink information. In some embodiments, if the UE does not respond prior to a stipulated timeout, the network may assume that the prior page was missed by the UE.

At 1010, in response to determining that a prior page was not missed by the UE, the network may page the UE via 3GPP (e.g., cellular) access. In some embodiments, this may typically be the case for a first paging attempt. Alternatively, at 1010, in response to determining that the UE is not in a connected state over non-3GPP access (e.g., the non-3GPP 5GMM function associated with the UE is not in the CM-CONNECTED state), the network may page the UE via 3GPP access.

At 1012, in response to determining that a prior page was missed by the UE, the network may send a NAS notification message over non-3GPP access to the UE. Alternatively, in response to determining that the UE is dual registered, the network may send a NAS notification message over non-3GPP access to the UE. The NAS notification message may indicate an access type of 3GPP.

In some embodiments, section 5.3.3.4 of TS 23.501 may be changed to recite that "In cases where the UE did not response to the page on 3GPP access due to some reason, the AMF may send NAS notification via Non-3GPP access to the UE before retrying back on 3GPP access."

In some embodiments, if the network determines that it has not responded to the NAS notification message over non-3GPP access, then, based on local policy, the network may re-attempt to page the UE over 3GPP access. In some embodiments, section 4.2.3.3 of TS 25.502 may be changed to recite "However, if the AMF does not receive a response from the UE to the NAS notification message, based on local policy, the AMF may retry via paging message to NG-RAN node(s) via 3GPP access to reach the UE."

Figure 11:
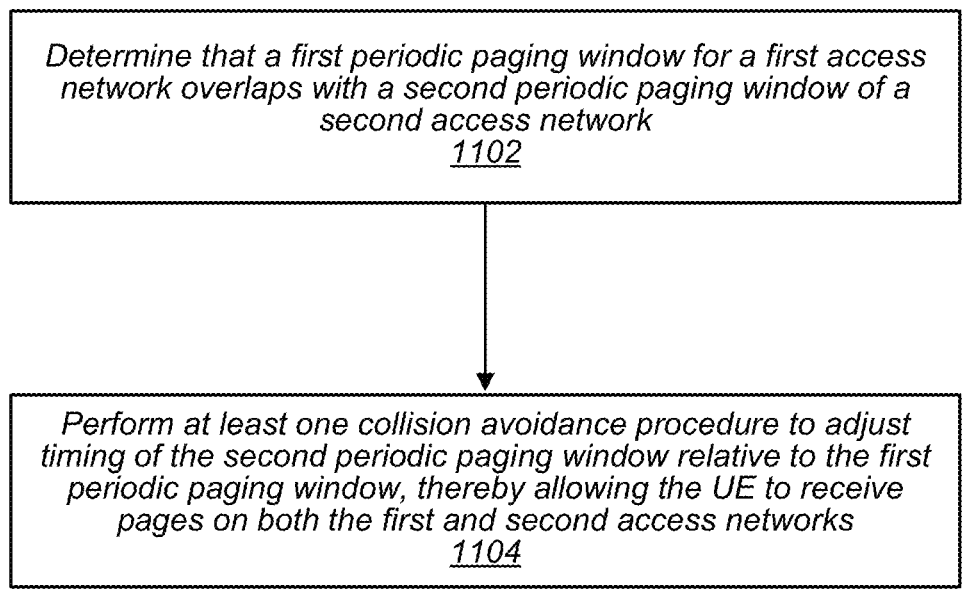
FIG. 11 illustrates a block diagram of an example of a method for a network to determine an access type to notify a UE of pending downlink information, according to some embodiments.

FIG. 11 illustrates a block diagram of an example of a method for a network to determine an access type to notify a UE of pending downlink information, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may determine that a first periodic paging window for a first access network overlaps with a second periodic paging window of a second access network. In some embodiments, the overlap may cause the UE to miss at least one page on one of the first or second access network. In some embodiments, the UE may be registered to the first access network and the second access network. In some embodiments, the first access network may operate according to a first cellular (e.g., 3GPP) radio access technology (RAT) and the second access network may operate according to a second cellular RAT. In some embodiments, the first RAT may be a 4G 3GPP RAT and the second RAT may be a 5G 3GPP RAT. In some embodiments, the first RAT may be a 3G 3GPP RAT and the second RAT may be a 5G 3GPP RAT. In some embodiments, the first RAT may be a 5G 3GPP RAT and the second RAT may be a 4G 3GPP RAT. In some embodiments, the first RAT may be 3GPP 5G NR and the second RAT may be 3GPP LTE.

In some embodiments, the first periodic paging window may include a first discontinuous reception cycle specified by the first access network. In some embodiments, the second periodic paging window may include a second discontinuous reception cycle specified by the second access network. In some embodiments, the UE may receive a first broadcast message specifying the first discontinuous reception cycle from the first access network. In some embodiments, the UE may receive a second broadcast message specifying the second discontinuous reception cycle from the second access network.

At 1104, the UE may perform at least one collision avoidance procedure to adjust the timing of the second periodic paging window relative to the first periodic paging window. In some embodiments, the avoidance procedure may allow the UE to receive pages on both the first and second access networks. In some embodiments, the collision avoidance procedure may include any, any combination of, and/or all of the UE transmitting to the first access network a request to change the first periodic paging window, the UE transmitting to the second access network a request to change the second periodic paging window, the UE negotiating a paging offset with the first access network, the UE negotiating a paging offset with the second access network, and/or the UE receiving, over non-cellular (e.g., non-3GPP) access, a NAS notification message from one of the first or second access networks.

In some embodiments, the request to change the first periodic paging window may be transmitted via NAS registration uplink message. In some embodiments, the change may specify a higher discontinuous reception cycle value. In some embodiments, the change in the first periodic paging window may at least partially reduce the overlap between the first and second periodic paging windows, thereby allowing the UE to receive pages from both the first and second access networks.

In some embodiments, the request to change the second periodic paging window may be transmitted via a NAS registration uplink message. In some embodiments, the change may specify a higher discontinuous reception cycle value. In some embodiments, the change in the second periodic paging window may at least partially reduce the overlap between the first and second periodic paging windows, thereby allowing the UE to receive pages from both the first and second access networks.

In some embodiments, the negotiation may include the UE transmitting a NAS registration uplink message indicating the paging offset to the first access network. In some embodiments, the paging offset may shift the first periodic paging window relative to the second periodic paging window such that the overlap between the first and second periodic paging windows is at least partially reduced, thereby allowing the UE to receive pages from both the first and second access networks.

In some embodiments, the negotiation may include the UE transmitting a NAS registration uplink message indicating the paging offset to the second access network. In some embodiments, the paging offset may shift the second periodic paging window relative to the first periodic paging window such that the overlap between the first and second periodic paging windows is at least partially reduced, thereby allowing the UE to receive pages from both the first and second access networks.

In some embodiments, the NAS notification message received from one of the first or second access network may indicate that one of the first or second access networks has pending downlink data for the UE. In some embodiments, the UE may have missed a prior page associated with the pending downlink data.

In some embodiments, the UE may initiate a connection over a non-3GPP access network. In addition, the UE may receive a NAS notification message via the connection over the non-3GPP access network. In some embodiments, the NAS notification message may indicate a 3GPP access type. The 3GPP access type may be associated with one of the first or second access networks. In some embodiments, the UE may be in a radio resource control (RRC) inactive state on the indicated 3GPP access type. In some embodiments, the UE may resume an RRC connection on the indicated 3GPP access type in response to the NAS notification message.

In some embodiments, the UE may request, to the first access network, to operate in mobile initiated connection only (MICO) mode. In such embodiments, the first access network may operate according to a 5G RAT. The UE may communicate on the second access network that may be operating according to a 4G RAT. The UE may determine that a quality of service requirement for an application is greater than a quality of service currently available via the second access network. In response, the UE may initiate a connection on the first access network to increase an available quality of service, thereby meeting the quality of service requirement for the application.

In some embodiments, the UE may request, to the first access network, to operate in mobile initiated connection only (MICO) mode. In such embodiments, the first access network may operate according to a 5G RAT. The UE may register on the first access network with MICO mode enabled and establish a non-3GPP connection associated with the first access network. The UE may communicate on the second access network that may be operating according to a 4G RAT. The UE may determine that the non-3GPP connection is no longer available and may re-register on the first access network with MICO mode disabled.

Figure 12:
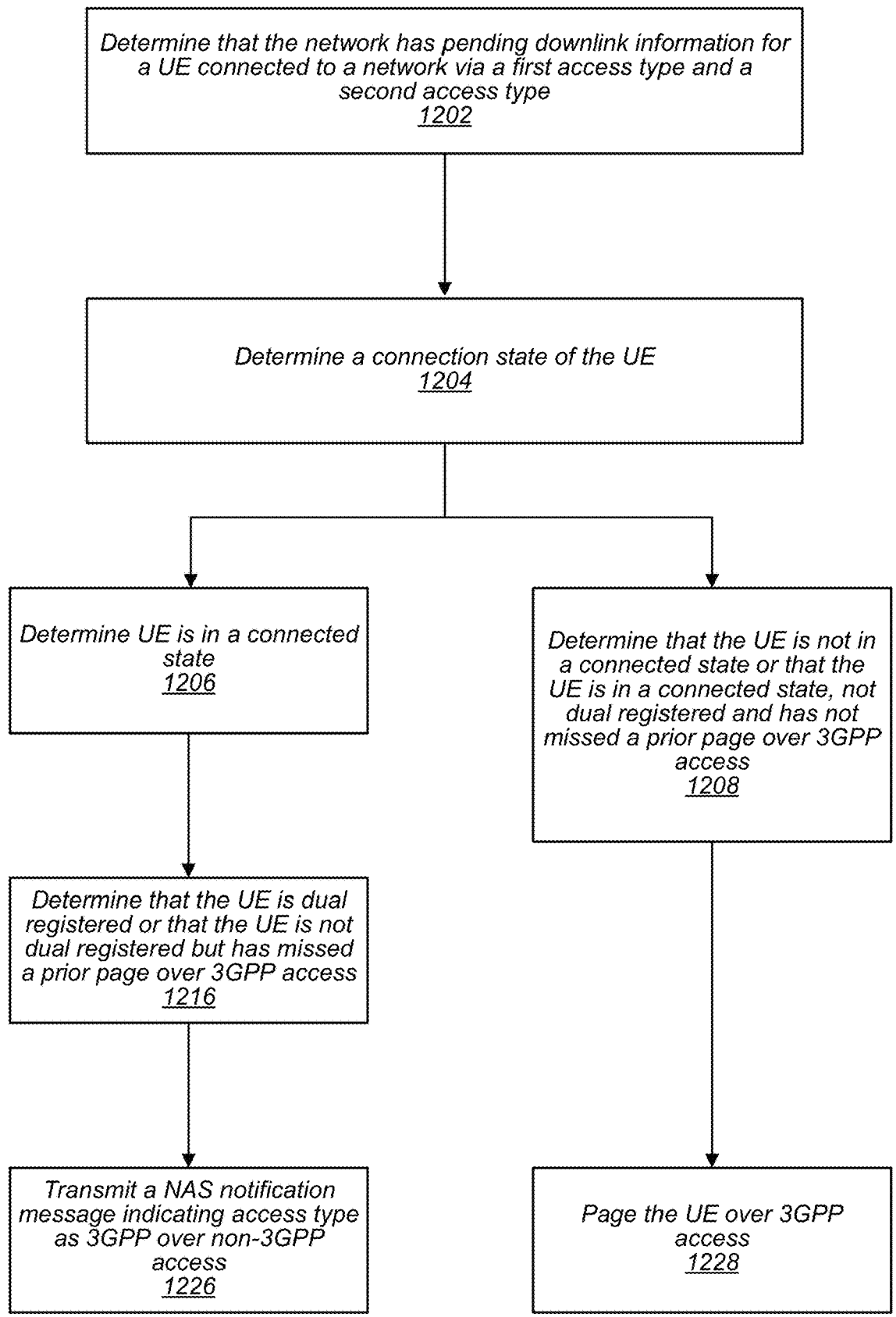
FIG. 12 illustrates a block diagram of another example of a method for a network to determine an access type to notify a UE of pending downlink information, according to some embodiments.

FIG. 12 illustrates a block diagram of another example of a method for a network to determine an access type to notify a UE of pending downlink information, according to some embodiments. The method shown in FIG. 12 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1202, a network node, such as base station 604, may determine that a network has pending downlink information for a UE, such as UE 106. In some embodiments, the network node may serve the UE and the UE may be connected to the network via a first access type and a second access type. In some embodiments, the downlink information may be associated with a voice call and/or data.

At 1204, the network node may determine a connection state of the UE. In some embodiments, determining the connection state of the UE may include determining a state of a 5G mobility management function associated with the UE.

At 1206, the network node may determine that the UE is in a connected state. Further, at 1216, the network node may determine that the UE is dual registered and/or that the UE is not dual registered but has missed a prior page over 3GPP (e.g., cellular) access. At 1226, the network node may transmit a NAS notification indicating an access type as 3GPP over a non-3GPP (e.g., non-cellular) access type. In some embodiments, the network node may determine that the UE has not responded to the NAS notification message but is in the connected state and may page the UE over a 3GPP access type. In some embodiments, the 3GPP connection may include (or be) a cellular connection and the non-3GPP connection may include (or be) a non-cellular connection. In some embodiments, the non-cellular connection may include (or be) a Wi-Fi connection.

At 1208, the network node may determine that the UE is not in a connected state and/or that the UE is in a connected state, not dual registered, and has not missed a prior page over 3GPP access. At 1228, the network node may page the UE over a 3GPP access type. In some embodiments, the 3GPP connection may include (or be) a cellular connection and the non-3GPP connection may include (or be) a non-cellular connection. In some embodiments, the non-cellular connection may include (or be) a Wi-Fi connection.

In some embodiments, the network node may receive, from the UE, a request to change a periodic paging window. In some embodiments, the request may be received via a NAS registration uplink message. In some embodiments, the change may specify a higher discontinuous reception cycle value and may at least partially reduce an overlap between the periodic paging window of the network and a periodic paging window of another network serving the UE, thereby allowing the UE to receive pages from both networks.

In some embodiments, the network node may negotiate, with the UE, a paging offset. In some embodiments, the negotiation may include the network node receiving a NAS registration uplink message indicating the paging offset. In some embodiments, the paging offset may shift a periodic paging window of the network relative to a periodic paging window of another network serving the UE such that the overlap is at least partially reduced, thereby allowing the UE to receive pages from both networks.

In some embodiments, the network node may receive, from the UE, a request to operate in mobile initiated connection only (MICO) mode. In such embodiments, the network node may also receive, from the UE, a request to initiate a connection to increase an available quality of service.

In some embodiments, the network node may receive, from the UE, a request to operate in mobile initiated connection only (MICO) mode. In such embodiments, the network node may approve the UE's request to operate with MICO mode enabled. The network node may receive, from the UE, a request to re-register with MICO mode disabled.

RRC Inactive to Connected Resumption

According to 3GPP TS 23.501 Release 15, in some implementations, when a device is CM-CONNECTED with RRC inactive state, the device may resume the RRC connection due to:
 (1) uplink data pending;
 (2) mobile initiated NAS signaling procedure;
 (3) as a response to RAN paging;

(4) notifying the network that it has left the RAN Notification Area; or
(5) upon periodic RAN Notification Area Update timer expiration.

Thus, in some implementations, a possibility of resumption of an RRC connection based on reception of a NAS notification message over non-3GPP access is not covered. Thus, benefits of being in an RRC-inactive state, such expected low an expected low latency to transition to an RRC-connected state, are not realized, especially in ultra-reliable and low-latency (uRLLC) systems. Thus, the network and device may maintain their respective security contexts and bearer information in the RRC-inactive state. Further, at indicated above, one of the possible options to transition from an RRC-inactive state to an RRC-connected state is via a paging mechanism. However, a paging mechanism may have an inherent worst-case delay of the paging DRX cycle. In other words, the network may need to wait up to 1.28 seconds in order to page the UE, which may lead to higher than acceptable delays for uRLLC systems.

Thus, in some embodiments, an AMF may determine to send a NAS notification message over a non-3GPP access (e.g., instead of waiting for a next available paging occasion) to aid a UE, such as UE 106, to transition from an RRC-inactive state to an RRC-connected state much more rapidly (e.g., in less than few milliseconds as compared to over one second for a paging DRX cycle). In some embodiments, when a UE is in a CM-CONNECTED state with RRC-inactive on a 3GPP access and on a non-3GPP access, an AMF may send a NAS notification via the non-3GPP access. The NAS notification may indicate an access type as 3GPP. In some embodiments, the UE may resume the RRC connection based on the reception of the NAS notification message via non 3GPP access indicating access type as 3GPP. In some embodiments, 3GPP TS 23.501 Release 15, section 5.3.3.2.5 may be updated to further recite that the UE may resume the RRC connection due to "Reception of NAS notification message via non-3GPP access indicating access type as 3GPP" and transition from RRC-inactive state to RRC-Connected state.

Dual-Registration Mode Extension

In some implementations, and according to 3GPP TS 23.501 Release 15, interworking between an evolved packet core (EPC) and a 5G core (5GC) may aid in moving a protocol data unit (PDU) when a device transitions between 5G and 4G (e.g., transitions from 5G to 4G and/or transitions from 4G to 5G). Additionally, a device may register to a 5GC for a PLMN or equivalent PLMNs through 3GPP as well as non-3GPP access and may further move PDUs from one access to another (e.g., from 3GPP to non-3GPP and/or from non-3GPP to 3GPP). In addition, a 5G device may operate in a mobile initiated connection only (MICO) mode. Note that a 5G device may request use of MICO mode in a registration request message to a network. However, the 5G device may only use MICO mode if the network accepts the request (e.g., via a MICO indication information element in a registration accept message sent to the 5G device from the network).

In MICO mode, only the 5G device can initiate a radio connection to the network. In other words, the network cannot page the 5G device. However, in some implementations, a 5G device in MICO mode over 3GPP access that also supports non-3GPP access, may be registered to a single AMF. Thus, the device may be registered to the AMF as a MICO device over 3GPP access and as a non-MICO device over non-3GPP access.

In some embodiments, a UE, such as UE 106 described above, may operate in a dual-registration mode extension with MICO mode enabled. In such embodiments, the UE may request dual-registration mode and indicate to a network or network entity (such as gNB 604) that the UE supports dual-registration mode. The network may indicate support for dual-registration mode via an interworking bit (e.g., IWK N26) in the 5G network feature support information element (IE) in a registration accept message. The UE may register to both a 4G network and a 5G network independently and may maintain registration status with both networks to a common PLMN. Additionally, the UE may acquire Wi-Fi and register to a common 5G core network (e.g., common to the 5G network) through non-3GPP access (e.g., Wi-Fi). In some embodiments, the UE may move a portion or all of its 5G PDUs to non-3GPP access. In some embodiments, the UE may establish multiple flows per 5G PDU (e.g., one flow over 3GPP access, another flow over non-3GPP access). In some embodiments, the UE may perform periodic registration updates on both access networks (e.g., 4G and 5G) in order to maintain its registration status on each access network. In some embodiments, the UE may move some or all PDUs from access technology to another at any time and the access networks may maintain IP continuity between the technologies. For example, the UE may move some or all PDUs from 4G to 5G and vice versa. As another example, the UE may move some or all PDUs from 5G-3GPP to 5G-non-3GPP and vice versa. In some embodiments, the UE may maintain independent security contexts for both access technologies (e.g., 4G and 5G).

In some embodiments, the UE may initiate registration by requesting MICO mode for the 5G network in 3GPP access. In such embodiments, if an application (e.g., executing on the UE) requires a higher quality of service (e.g., a higher data rate (or usage) and/or a lower latency) than is currently available on the 5G non-3GPP network, the UE may initiate a 5G cellular connection on the 5G network and increase the quality of service by combining flows per a data PDU over 5G 3GPP access as well as 5G non-3GPP access. In some embodiments, after serving the higher quality of service requirement, the UE and/or network may choose to move to IDLE state over 5G 3GPP access while remaining in MICO mode. In some embodiments, UE and 5G core network may use non-3GPP access to deliver Mobile terminated data as well as serve low data requirement applications without the need of 5G 3GPP cellular resources. In some embodiments, if Wi-Fi (e.g., 5G non-3GPP access) is lost, the UE may attempt to register over 5G 3GPP access and may re-register by disabling the MICO mode with a hysteresis timer to avoid frequent re-registrations. In other words, if the UE determines that 5G non-3GPP access is not available (or no longer currently available), the UE may re-register for 5G 3GPP access to disable the MICO mode. In some embodiments, the hysteresis timer value can be selected (or determined and/or chosen) as configurable to support different type of devices. Note that this approach (or mechanism) is not limited to internet data PDU and can be readily extended to any other service and/or PDU. In some embodiments, 5G non-3GPP access (e.g., Wi-Fi access) may be used for reachability purposes over 5G while 5G 3GPP access may remain in MICO mode, thereby saving resources (e.g., the UE does not need to monitor 5G 3GPP access for pages) while maintaining ability to increase downlink quality of service as needed. In addition to avoiding tune away from 4G access to 5G access to monitor 5G pages, such an approach may also avoid paging collisions associated with dual mode operation and eliminate signaling associated with dual mode operation, e.g., such as service request messages to 5G network to indicate tune away and registration procedure messages to resume data reception over 5G network.

In some embodiments, 3GPP TS 23.501 Release 15, section 5.17.3, which covers interworking with EPC in presence of Non-3GPP PDU sessions may be modified to recite that:

When a UE is simultaneously connected to the 5GC over a 3GPP access and a non-3GPP access: UE supports dual-registration mode, the UE and the AMF may optimize the power efficiency and signaling efficiency of the UE when in CM-IDLE state by activating MICO mode (see clause 5.4.1.3). When sending a control plane request for MT services (e.g. MT SMS) the network routes it via the EPC.

Further, in some embodiments, 3GPP TS 23.501 Release 15, section 5.17.2.3.3, which covers mobility for UEs in dual-registration mode, may have NOTE 4 modified to recite that "When device is in MICO mode and CM-IDLE state, network shall choose EPC to deliver MT services."

Figure 13:
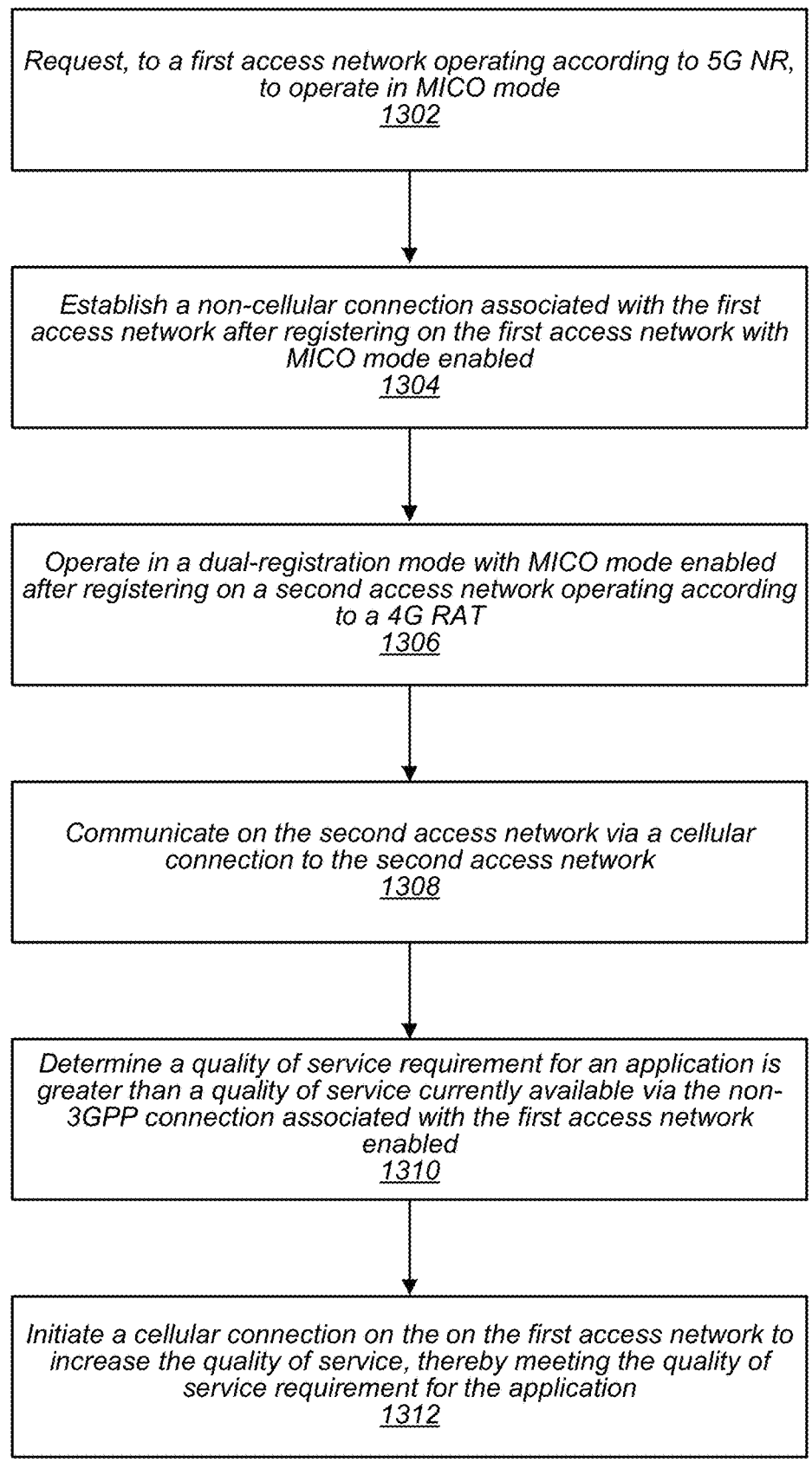
FIG. 13 illustrates a block diagram of an example of a method for a UE to operate in a dual registration mode, according to some embodiments.

FIG. 13 illustrates a block diagram of an example of a method for a UE to operate in a dual registration mode, according to some embodiments. The method shown in FIG. 13 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may request, to a first access network operating according to 5G NR, to operate in MICO mode.

At 1304, the UE may establish a non-cellular (e.g., non-3GPP) connection associated with the first access network after registering on the first access network with MICO mode enabled.

At 1306, the UE may operate in a dual-registration mode with MICO mode enabled after registering on a second access network operating according to a 4G RAT.

At 1308, the UE may communicate on the second access network via a cellular (e.g., 3GPP) connection to the second access network.

At 1310, the UE may determine a quality of service requirement for an application is greater than a quality of service currently available via the non-cellular (e.g., non-3GPP) connection associated with the first access network enabled. In some embodiments, the quality of service requirement may include one of a data rate requirement and/or a latency requirement.

At 1312, the UE may initiate a cellular connection on the on the first access network to increase the quality of service, thereby meeting the quality of service requirement for the application.

In some embodiments, the UE may determine that the non-cellular connection is no longer available. In such embodiments, the UE may re-register on the associated first access network with MICO mode disabled.

In some embodiments, the UE may maintain a first security context associated with the first access network and a second security context associated with the second access network.

In some embodiments, the UE may determine that the quality of service requirement is no longer necessary and may move (or transition) to an idle state on the first access network with MICO mode enabled.

In some embodiments, the UE may determine that a first periodic paging window for the first access network overlaps with a second periodic paging window of the second access network. In some embodiments, the overlap may cause the UE to miss at least one page on one of the first or second access networks. In some embodiments, the first periodic paging window may include a first discontinuous reception cycle specified by the first access network. In some embodiments, the second periodic paging window may include a second discontinuous reception cycle specified by the second access network. In some embodiments, the UE may receive a first broadcast message specifying the first discontinuous reception cycle from the first access network. In some embodiments, the UE may receive a second broadcast message specifying the second discontinuous reception cycle from the second access network. The UE may, in response to determining the overlap, perform at least one collision avoidance procedure to adjust the timing of the second periodic paging window relative to the first periodic paging window, thereby allowing the UE to receive pages on both the first and second access networks.

In some embodiments, the collision avoidance procedure may include any, any combination of, and/or all of the UE transmitting to the first access network a request to change the first periodic paging window, the UE transmitting to the second access network a request to change the second periodic paging window, the UE negotiating a paging offset with the first access network, the UE negotiating a paging offset with the second access network, and/or the UE receiving, over non-3 GPP access, a NAS notification message from one of the first or second access networks.

In some embodiments, the request to change the first periodic paging window may be transmitted via NAS registration uplink message. In some embodiments, the change may specify a higher discontinuous reception cycle value. In some embodiments, the change in the first periodic paging window may at least partially reduce the overlap between the first and second periodic paging windows, thereby allowing the UE to receive pages from both the first and second access networks.

In some embodiments, the request to change the second periodic paging window may be transmitted via a NAS registration uplink message. In some embodiments, the change may specify a higher discontinuous reception cycle value. In some embodiments, the change in the second periodic paging window may at least partially reduce the overlap between the first and second periodic paging windows, thereby allowing the UE to receive pages from both the first and second access networks.

In some embodiments, the negotiation may include the UE transmitting a NAS registration uplink message indicating the paging offset to the first access network. In some embodiments, the paging offset may shift the first periodic paging window relative to the second periodic paging window such that the overlap between the first and second periodic paging windows is at least partially reduced, thereby allowing the UE to receive pages from both the first and second access networks.

In some embodiments, the negotiation may include the UE transmitting a NAS registration uplink message indicating the paging offset to the second access network. In some embodiments, the paging offset may shift the second periodic paging window relative to the first periodic paging window such that the overlap between the first and second periodic paging windows is at least partially reduced, thereby allowing the UE to receive pages from both the first and second access networks.

In some embodiments, the NAS notification message received from one of the first or second access network may indicate that one of the first or second access networks has pending downlink data for the UE. In some embodiments, the UE may have missed a prior page associated with the pending downlink data.

In some embodiments, the UE may initiate a connection over a non-3GPP access network and receive a NAS notification message via the connection over the non-3GPP access network. In some embodiments, the NAS notification message may indicate a 3GPP access type that is associated with one of the first or second access networks. In some embodiments, the UE may be in a radio resource control (RRC) inactive state on the indicated 3GPP access type. In some embodiments, the UE may resume an RRC connection on the indicated 3GPP access type in response to the NAS notification message.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one cellular radio access technology (RAT); and
one or more processors coupled to the at least one radio, wherein the one or more processors and the at least one radio are configured to perform voice and/or data communications;
wherein the one or more processors are configured to cause the UE to:
    determine, at the UE, that a first paging occasion for a first 3GPP network overlaps with a second paging occasion of a second 3GPP network, wherein the overlap causes the UE to miss at least one page on one of the first or second 3GPP networks, wherein the UE is registered to the first 3GPP network and the second 3GPP network; and
    in response to determining that the first paging occasion overlaps with the second paging occasion, perform at least one collision avoidance procedure that results in a timing of the second paging occasion being adjusted relative to the first paging occasion, thereby allowing the UE to receive pages on both the first and second 3GPP networks, wherein the at least one collision avoidance procedure includes the UE transmission of a non-access stratum (NAS) request message to adjust the timing of the second paging occasion relative to the first paging occasion.

2. The UE according to claim 1,
wherein the first paging occasion includes a first discontinuous reception cycle specified by the first 3GPP network, and wherein the second paging occasion includes a second discontinuous reception cycle specified by the second 3GPP network, and wherein the one or more processors are further configured to cause the UE to:
    receive, from the first 3GPP network, a first broadcast message specifying the first discontinuous reception cycle; and
    receive, from the second 3GPP network, a second broadcast message specifying the second discontinuous reception cycle.

3. The UE according to claim 1,
wherein the at least one collision avoidance procedure further comprises at least one of:
    the UE transmitting to the second 3GPP network a request to change the second paging occasion, wherein the request is transmitted via a NAS registration uplink message, wherein the change specifies a higher discontinuous reception cycle value, and wherein the change in the second paging occasion at least partially reduces the overlap between the first and second paging occasions, thereby allowing the UE to receive pages from both the first and second 3GPP networks;
    the UE negotiating a paging offset with the second 3GPP network, wherein the negotiation includes the UE transmitting a NAS registration uplink message indicating the paging offset to the second 3GPP network, wherein the paging offset shifts the second paging occasion relative to the first paging occasion such that the overlap between the first and second paging occasions is at least partially reduced, thereby allowing the UE to receive pages from both the first and second 3GPP networks; or
    the UE receiving, over non-cellular access, a NAS notification message from one of the first or second 3GPP networks, wherein the NAS notification message indicates that one of the first or second 3GPP networks has pending downlink data for the UE, and wherein the UE has missed and/or not responded to a prior page associated with the pending downlink data.

4. The UE according to claim 1, wherein the one or more processors are further configured to cause the UE to:
   initiate a connection over a non-cellular access network;
   receive a NAS notification message via the connection over the non-cellular access network, wherein the NAS notification message indicates a 3GPP access type, wherein the 3GPP access type is associated with one of the first or second 3GPP networks, and wherein the UE is in a radio resource control (RRC) inactive state on the indicated 3GPP access type; and
   resume an RRC connection on the indicated 3GPP access type in response to the NAS notification message.

5. The UE according to claim 1, wherein the one or more processors are further configured to cause the UE to:
   request, to the first 3GPP network, to operate in mobile initiated connection only (MICO) mode, wherein the first 3GPP network operates according to a fifth generation (5G) radio access technology (RAT);
   communicate on the second 3GPP network, wherein the second 3GPP network operates according to a fourth generation (4G) RAT;
   determine a quality of service requirement for an application is greater than a quality of service currently available via the second 3GPP network; and
   initiate a connection on the first 3GPP network to increase an available quality of service, thereby meeting the quality of service requirement for the application.

6. The UE according to claim 1, wherein the one or more processors are further configured to cause the UE to:
   request, to the first 3GPP networks, to operate in mobile initiated connection only (MICO) mode, wherein the first 3GPP network operates according to a fifth generation (5G) radio access technology (RAT);
   register on the first 3GPP network with MICO mode enabled;
   establish a non-3GPP connection associated with the first 3GPP network;
   communicate on the second 3GPP network, wherein the second 3GPP network operates according to a fourth generation (4G) RAT;
   determine that the non-3GPP connection is no longer available; and
   re-register on the first 3GPP network with MICO mode disabled.

7. The UE according to claim 1, wherein the NAS message includes an indication of an offset to adjust the timing of the second paging occasion.

8. The UE according to claim 1, wherein the first 3GPP network operates according to a first cellular radio access technology (RAT), and wherein the second 3GPP network operates according to a second cellular RAT.

9. An apparatus, comprising:
   a memory; and
   at least one processor in communication with the memory;
   wherein the at least one processor is configured to:
   determine that a first paging occasion for a first 3GPP network overlaps with a second paging occasion of a second 3GPP network, wherein the overlap causes at least one page on one of the first or second 3GPP networks to be missed; and
   in response to determining that the first paging occasion overlaps with the second paging occasion, perform at least one collision avoidance procedure that results in a timing of the second paging occasion being adjusted relative to the first paging occasion, thereby allowing the UE to receive pages on both the first and second 3GPP networks, wherein the at least one collision avoidance procedure includes the UE transmitting a non-access stratum (NAS) request message to adjust the timing of the second paging occasion relative to the first paging occasion.

10. The apparatus according to claim 9, wherein the first paging occasion includes a first discontinuous reception cycle specified by the first 3GPP network, and wherein the second paging occasion includes a second discontinuous reception cycle specified by the second 3GPP network.

11. The apparatus according to claim 9, wherein the at least one collision avoidance procedure further comprises at least one of:
   generating instructions to cause negotiation of a paging offset with the first 3GPP network, wherein the negotiation includes transmission of a NAS registration uplink message indicating the paging offset to the first 3GPP network; or
   generating instructions to cause negotiation of a paging offset with the second 3GPP network, wherein the negotiation includes transmission of a NAS registration uplink message indicating the paging offset to the second 3GPP network.

12. The apparatus according to claim 9, wherein the at least one collision avoidance procedure further comprises at least one of:
   receiving, over a celluar-3GPP access connection, a NAS notification message from one of the first or second 3GPP networks, wherein the NAS notification message indicates that one of the first or second 3GPP networks has pending downlink data, and wherein the a prior page associated with the pending downlink data has been missed.

13. The apparatus according to claim 9, wherein the at least one processor is further configured to:
   initiate a connection over a non-cellular access network;
   receive a NAS notification message via the connection over the non-cellular access network, wherein the NAS notification message indicates a 3GPP access type, wherein the 3GPP access type is associated with one of the first or second 3GPP networks, and wherein the apparatus is in a radio resource control (RRC) inactive state on the indicated 3GPP access type; and
   resume an RRC connection on the indicated 3GPP access type in response to the NAS notification message.

14. The apparatus according to claim 9, wherein the at least one processor is further configured to:
   request, to the first 3GPP network, to operate in mobile initiated connection only (MICO) mode, wherein the first 3GPP network operates according to a fifth generation (5G) radio access technology (RAT);

communicate on the second 3GPP network, wherein the second 3GPP network operates according to a fourth generation (4G) RAT;

determine a quality of service requirement for an application is greater than a quality of service currently available via the second 3GPP network; and initiate a connection on the first 3GPP network to increase an available quality of service, thereby meeting the quality of service requirement for the application.

15. The apparatus according to claim 9, wherein the at least one processor is further configured to:

request, to the first 3GPP networks, to operate in mobile initiated connection only (MICO) mode, wherein the first 3GPPnetwork operates according to a fifth generation (5G) radio access technology (RAT);

register on the first 3GPP network with MICO mode enabled;

establish a non-3GPP connection associated with the first 3GPP network;

communicate on the second 3GPP network, wherein the second 3GPP network operates according to a fourth generation (4G) RAT;

determine that the non-3GPP connection is no longer available; and re-register on the first 3GPP network with MICO mode disabled.

16. The apparatus according to claim 9, wherein transmission of the NAS request message by the apparatus to adjust the timing of the second paging occasion includes transmission of a request to change the second paging occasion to the second 3GPP network via a NAS registration uplink message.

17. A non-transitory computer readable memory medium storing program instructions executable by processing circuitry to cause a user equipment device (UE) to:

determine that a first paging occasion for a first 3GPP network overlaps with a second paging occasion of a second 3GPP network, wherein the overlap causes the UE to miss at least one page on one of the first or second 3GPP networks, wherein the UE is registered to the first 3GPP network and the second 3GPP network; and in response to determining that the first paging occasion overlaps with the second paging occasion, perform at least one collision avoidance procedure that results in a timing of the second paging occasion being adjusted relative to the first paging occasion, thereby allowing the UE to receive pages on both the first and second 3GPP networks, wherein the at least one collision avoidance procedure includes the UE transmitting a non-access stratum (NAS) request message to adjust the timing of the second paging occasion relative to the first paging occasion.

18. The non-transitory computer readable memory medium according to claim 17, wherein the at least one collision avoidance procedure further comprises:

the UE transmitting to the second 3GPP network a request to change the second paging occasion, wherein the request is transmitted via a NAS registration uplink message, wherein the change specifies a higher discontinuous reception cycle value, and wherein the change in the second paging occasion at least partially reduces the overlap between the first and second paging occasions, thereby allowing the UE to receive pages from both the first and second 3GPP networks.

19. The non-transitory computer readable memory medium according to claim 17, wherein the at least one collision avoidance procedure further comprises:

the UE negotiating a paging offset with the second 3GPP network, wherein the negotiation includes the UE transmitting a NAS registration uplink message indicating the paging offset to the second 3GPP network, wherein the paging offset shifts the second paging occasion relative to the first paging occasion such that the overlap between the first and second paging occasions is at least partially reduced, thereby allowing the UE to receive pages from both the first and second 3GPP networks.

20. The non-transitory computer readable memory medium according to claim 17, wherein the at least one collision avoidance procedure further comprises:

the UE receiving, over cellular access, a NAS notification message from one of the first or second 3GPP networks, wherein the NAS notification message indicates that one of the first or second 3GPP networks has pending downlink data for the UE, and wherein the UE has missed or not responded to a prior NAS notification message over non-cellular access.

* * * * *

UNITED STATES PATENT AND TRADEMARK OFFICE
CERTIFICATE OF CORRECTION

PATENT NO. : 12,133,295 B2  
APPLICATION NO. : 16/525934  
DATED : July 30, 2019  
INVENTOR(S) : Vijay Venkataraman et al.

Page 1 of 1

It is certified that error appears in the above-identified patent and that said Letters Patent is hereby corrected as shown below:

In the Claims

Column 30, Line 22, delete "transmission" and insert --transmitting--.  
Column 32, Line 11, delete "the UE to receive".  
Column 32, Line 11, delete "pages" and insert --pages to be received--.  
Column 32, Line 13, delete "the UE".  
Column 32, Line 39, delete "celluar" and insert --cellular--.  
Column 33, Line 15, delete "3GPPnetwork" and insert --3GPP network--.

Signed and Sealed this  
Twenty-ninth Day of April, 2025

Coke Morgan Stewart  
*Acting Director of the United States Patent and Trademark Office*